United States Patent
Knutson et al.

[11] Patent Number: 5,807,194
[45] Date of Patent: Sep. 15, 1998

[54] TOOTHED BELT

[75] Inventors: Paul S. Knutson, Aurora, Colo.;
Walter L. Dodson, Elizabethtown, Ky.

[73] Assignee: The Gates Corporation, Denver, Colo.

[21] Appl. No.: 741,892

[22] Filed: Oct. 31, 1996

[51] Int. Cl.$^6$ .................. F16G 1/04; F16G 1/00
[52] U.S. Cl. .................. 474/268; 474/237; 474/273
[58] Field of Search .................. 474/202, 204, 474/205, 261, 263, 266, 268, 271; 156/137, 138, 139; 57/902

[56] References Cited

U.S. PATENT DOCUMENTS

| | | | |
|---|---|---|---|
| 3,138,962 | 6/1964 | Haines et al. | |
| 3,200,180 | 8/1965 | Russ et al. | |
| 3,349,634 | 10/1967 | Terhune et al. | |
| 3,792,621 | 2/1974 | Smith | 74/231 R |
| 3,894,900 | 7/1975 | Redmond | |
| 3,964,328 | 6/1976 | Redmond, Jr. | 74/231 C |
| 4,342,809 | 8/1982 | Newell | 428/215 |
| 4,498,891 | 2/1985 | Mashimo et al. | 474/205 |
| 4,605,389 | 8/1986 | Westhoff | |
| 4,838,843 | 6/1989 | Westhoff | |
| 5,112,282 | 5/1992 | Patterson | 474/260 |
| 5,209,705 | 5/1993 | Gregg | |
| 5,308,696 | 5/1994 | Hanashita et al. | 428/357 |
| 5,645,504 | 7/1997 | Westhoff | 474/250 |

*Primary Examiner*—Tamara L. Graysay
*Assistant Examiner*—Gary S. Hartmann
*Attorney, Agent, or Firm*—H. W. Oberg; C. H. Castleman, Jr.

[57] ABSTRACT

A synchronous power transmission belt with a belt body of cast urethane belt material, belt teeth formed of the body, a wear-resistant fabric reinforcement disposed along peripheral surfaces of the belt teeth, and a tensile member of helically spiraled cord embedded in the belt body and of a yarn of carbon fiber.

7 Claims, 2 Drawing Sheets

Aramid

TOOTHED BELT

BACKGROUND OF THE INVENTION

The invention relates to power transmission belts, but more particularly, the invention relates to textile cord and its treatment as a tensile member as embedded in a urethane body of a power transmission belt, and more preferably, a toothed power transmission belt.

Textile cord has long been used as a tensile reinforcement in a power transmission belt. The cord is embedded in a body of elastomeric belt material forming the belt and has a treatment that promotes adhesion with the belt material and inhibits degradation of textile filaments that form the cord. However, the treatment can make the cord too stiff so as to significantly impair the bending modulus of either the cord or belt. As a result, there is no single cord treatment that works well for all belts. Generally speaking, a new treatment must be established when either the cord material or belt material is significantly changed.

For example, when the cord material is cotton, rayon or nylon and the belt material is rubber such as neoprene, the cord treatment may involve dipping the cord in resorcinol-formaldehyde-latex (RFL) followed by dipping the cord in a tackifier formed of rubber and a solvent.

When the cord material is polyester and the belt material is rubber, the cord treatment may involve dipping the cord in methylene di-phenylene isocyanate (MDI).

When the cord material is fiberglass and the belt material is rubber, the cord treatment may involve dipping the cord in silane followed by dipping the cord in RFL.

When the cord material is aramid and the belt material is rubber, the treatment may involve dipping the cord in an epoxy followed by dipping in RFL followed by dipping in a tackifier of rubber dissolved in a solvent.

Changing the belt material may also have a substantial impact on cord treatment or cord selection. For example, castable urethane as a belt material may form a significant part of the cord treatment. When the urethane is in a liquid state it may penetrate interstices of the cord. However, urethane in its cured state as a high modulus belt material may make a particular cord material unacceptable when it penetrates the interstices of the cord because the so penetrated cord may have an unacceptable bending modulus. Also, the penetrating urethane may transfer too high a strain to filaments comprising the cord to cause unacceptable filament breakage resulting in cord failure. In some cases, cotton and fiberglass cord materials are unacceptable for use with urethane belt material for this reason.

Because of unforeseen problems associated with cord material, cord treatment has taken an unpredictable zig-zag path over the past thirty plus years since urethane was first introduced and effectively used as a belt material in 1964. Referring to 1964 U.S. Pat. No. 3,138,962 (Haines et al.), a power transmission belt with a textile cord as a tensile reinforcement is embedded in a belt body of urethane belt material. The identified cord materials are Dacron (polyester), cotton, nylon, rayon and fortisan (cellulose acetate) while the preferential cord material of the day was polyester. The feature of the Haines et al. invention is the cord treatment where uncured castable urethane completely penetrates the cord and completely fills the interstices formed by fiber comprising the cord. In other words, the 1964 state of the art cord treatment was to completely fill the cord interstices 100 percent with urethane belt material. Such treatment of filling the cord 100 percent was short lived as the cord bending modulus was too high which resulted in further developments of cord treatment.

Referring to 1967 U.S. Pat. No. 3,349,634 (Terhune et al.), a power transmission belt with a textile cord as a tensile reinforcement is embedded in a belt body of urethane belt material. The cord material identified is nylon, rayon, or polyester while the preferred material of the day was polyester. Terhune et al. recognized that the treatment of complete penetration of the cord interstices with urethane tends to make a solid mass of the cord and the belt and thereby reduces elasticity. The feature of Terhune et al. is a cord pretreatment where the cord is dipped in a material that thoroughly impregnates the fiber comprising the cord. The dip material at the time of Terhune et al. was isocyanate. During belt manufacture liquid urethane belt material penetrates the cord to a depth of no more than 10 percent of the diameter of the cord to thereby complete in situ cord treatment. This pretreatment of filling the cord core up to 90 percent of its diameter with isocyanate and completing the treatment by filling the remaining 10 percent of its diameter with urethane remains in use today for polyester cord material.

In 1975 U.S. Pat. No. 3,894,900 (Redmond), a power transmission belt with a cord reinforcement of aramid material is embedded in a belt body of urethane belt material. The feature of Redmond's invention concerns an elastomer-free surface for a power transmission belt made with castable urethane as a belt material. Textile cord of aramid material (among listed others) is embedded in the belt body as a tensile reinforcement. Redmond acknowledges a cord treatment to the extent that the cord may be impregnated with a suitable material. However, Redmond does not identify types of suitable material for aramid cord or how the cord is impregnated.

The combination of aramid cord material sold under the trademark Kevlar (among listed others) and urethane belt material is disclosed in 1989 U.S. Pat. No. 4,838,843 (Westhoff). The cord treatment disclosed by Westhoff is that the cord is embedded in and substantially surrounded by urethane such that the cord bonds with the urethane with a bonding value of 600 psi. Thus, the cord treatment comprises liquid urethane of the belt material penetrating a portion of the interstices formed by fibers comprising the cord.

All of the aforementioned patents except Westhoff give an across-the-board "laundry list" identification of cord materials that has little to do with the particularly disclosed invention and, similarly, many give an across-the-board "laundry list" identification of belt materials. Cord materials and belt materials are chronologically added to the "laundry list" as the new materials are developed.

The 1996 U.S. Pat. No. 5,209,705 (Gregg), also uses a "laundry list" approach for identifying cord materials and belt materials. For an invention pertaining to the orientation of belt teeth for a power transmission belt, it gives an across-the-board list of cord materials as glass fiber, carbon fiber, steel, polyester, high tenacity rayon, or preferably polyaramid. Similarly, it gives an across-the-board list of belt materials as polychloroprene, polyurethane, NBR, IIR, IR, SBR, CSM, EPDM and others. Gregg implies that the belt materials and cord materials could be used in all possible combinations but it is known from industry experience that not all of the combinations of belt materials and cord materials will work effectively.

One of the possible combinations of Gregg is a cord material of carbon fiber and a belt material of urethane. The problem is that Gregg does not disclose a cord treatment for any of the possible cord material and belt material combinations. More particularly, Gregg does not disclose what type of cord treatment is necessary to protect and inhibit extremely brittle carbon fibers from prematurely shattering when subjected to cyclic bending in a urethane body of a toothed power transmission belt. The present invention is directed to the solution of the problem when a cord material of carbon fiber is embedded in a belt body of urethane belt material. The problem is solved with a treatment of the cord as it is embedded in a belt body of urethane material.

SUMMARY OF THE INVENTION

In accordance with the invention, a synchronous power transmission belt is provided comprised of a belt body of cast urethane belt material, belt teeth formed of the body and spaced apart at a pitch, a wear-resistant fabric reinforcement disposed along peripheral surfaces of the belt teeth, a tensile member of helically spiraled cord embedded in the belt body and of a yarn of carbon fibers. A cord treatment essential to the invention comprises the cord picking up a minimum amount of belt material as the belt is cast. Belts so constructed in accordance with the invention exhibit an unexpected improvement over prior art belts particularly those constructed with a tensile member constructed of aramid fiber.

Other features and advantages of the invention will be apparent after reviewing the figures and description thereof wherein.

DESCRIPTION OF PREFERRED EMBODIMENT

Figure 1:
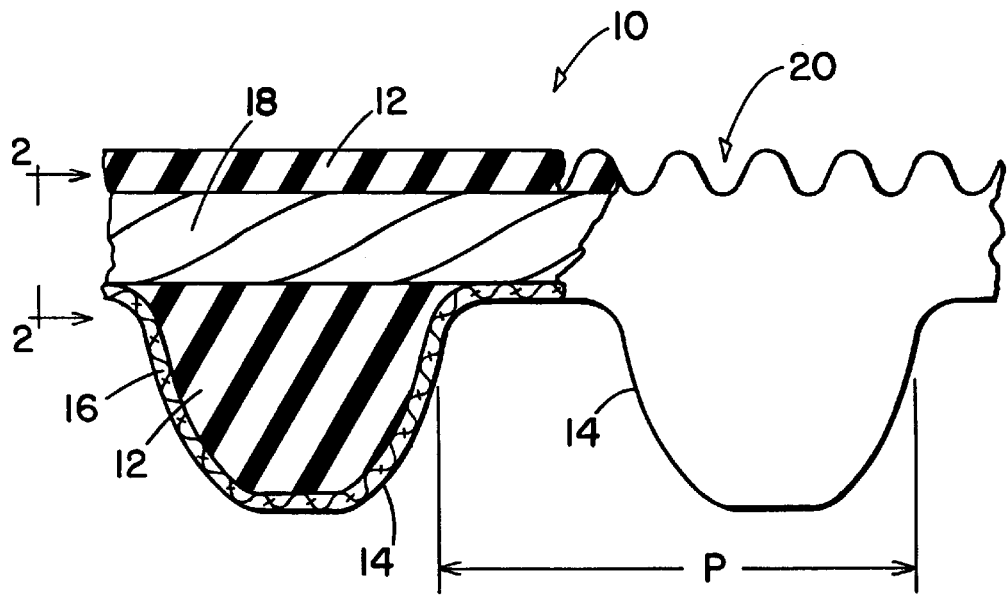
FIG. 1 is a partial longitudinal section view, partially cut away in cross-section, showing a belt of the invention with an embedded cord and belt teeth.
Figure 2:
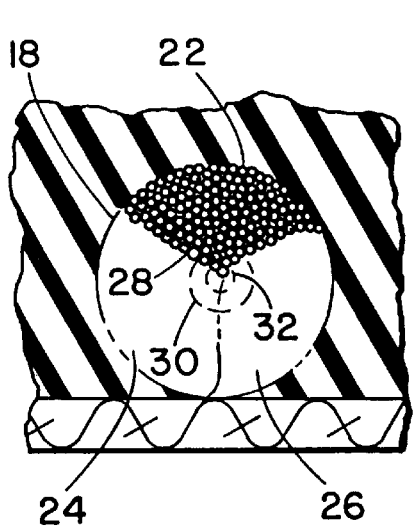
FIG. 2 is an enlarged, partial cross-sectional view taken along the line 2—2 of FIG. 1 showing an embedded cord.

Referring to FIGS. 1–2, the belt 10 of the invention has a body 12 of cast urethane belt material with belt teeth 14 formed of the body and spaced apart at a pitch P. The teeth are covered with a wear-resistant fabric 16 disposed along peripheral surfaces of the belt teeth. A tensile member 18 of helically spiraled cord is embedded in the belt body.

The belt is fabricated using known processing techniques. The body is cast of a liquid urethane belt material that, when cured, has the requisite physical characteristics for a power transmission belt. For example, the urethane may have the properties as disclosed in U.S. Pat. No. 4,838,843 to Westhoff where the urethane belt material has a tensile modulus of at least about 1500 psi at an elongation of 100 percent when tested using standard ASTM procedures. The urethane may exhibit a tensile modulus of at least about 1700 psi at an elongation of 100 percent. Another example of a urethane that may be used is disclosed in U.S. Pat. No. 5,112,282 to Patterson et al. A urethane that exhibits high temperature properties is disclosed in WO Publication 96/02584 (Feb. 1, 1996) to Wu et al. Whatever the urethane that is chosen, it must have a requisite property that, when in liquid form during casting, is able to flow and penetrate interstices of the cord as is later explained in further detail.

A plurality of transversely oriented grooves 20 may optionally be formed in an outer layer of the belt. While not necessary, the grooves 20 reduce belt weight and somewhat enhance belt flexibility.

This spaced teeth 14 formed of the body may have any desired cross-sectional shape such as trapezoidal, curvilinear, or curvilinear truncated. Examples of curvilinear tooth shapes appear in U.S. Pat. Nos. 3,756,091 to Miller, 4,515,577 to Cathey et al. and 4,605,389 to Westhoff.

Cured urethane exhibits a high coefficient of friction (e.g. about 0.65) with most belt sprocket materials. Consequently, it is necessary to reduce the coefficient of friction to be "non-aggressive" (e.g. below about 0.45) along the belt teeth so that the belt teeth can easily enter and exit grooves of a sprocket. The wear-resistant fabric 16 disposed at the peripheral surface of the belt teeth not only provides wear-resistance, but it also increases tooth sheer strength and reduces the aggressiveness of the belt teeth when entering grooves of a sprocket. Preferably, the fabric has a low coefficient of friction such as disclosed in U.S. Pat. No. 3,964,328 to Redmond. The fabric must also exhibit some stretchability to accommodate tooth deflection when the belt is in use. Crimped nylon fabric has proved satisfactory for the wear-resistant fabric 16.

The tensile member 18 in the form of a cord is helically spiraled across the width of the belt in spaced side-by-side fashion. The cord preferably occupies from about 56 to about 80 percent of the belt width, and more preferably, from about 64 to about 81 percent of the belt width. It is necessary that the cord be embedded in and substantially surrounded by urethane of the body so that the cord bonds with the urethane body.

The cord comprising the tensile member is made of carbon fibers and an example of which is carbon fiber as sold by Amoco. Carbon fiber is typically made by carbonizing another fiber such as polyacrylonitrile fiber wherein the carbonizing process the diameter of the fiber is substantially reduced. Carbon yarn is characterized by the number of fibers contained therein rather than by denier or dtex. A nomenclature of numbers and the letter "K" are used to denote the number of carbon fibers in a yarn. Of course, carbon fiber may be characterized by such terms where desired. In a "3K" carbon fiber yarn, the "K" is an abbreviated designation for "1000 fibers," and the "3" designates a multiplier. Thus "3K" carbon yarn identifies a yarn of 3000 fibers or filaments.

Like other textile materials, a number of carbon fibers are combined to form a yarn. A yarn may be combined with other yarn to form a larger yarn and the yarn or yarn bundles may be twisted together to form a cord.

Carbon fiber has an extremely small diameter which may be 6.5 microns. Individual fibers are easily fractured when a yarn is processed to form a cord. For this reason, it is desirable to minimize the number of mechanical operations that the yarn is subject to when forming a cord. For example, twisting several yarns together to form a yarn bundle and reverse twisting the so plied yarn bundles to form a cord are mechanical operations that fractures individual fibers. The number of fractures are lessened by reducing the number of twisting operations.

Fiber manufacturers oftentimes coat fibers with a sizing which acts to lubricate the fiber and inhibit fracturing as the fiber is processed into yarns and wound on spools. In some instances, the sizing may have a chemical structure that is compatible with an adhesive used to treat a cord for inclusion into a power transmission belt.

Referring to FIG. 2, a 6K-3 cord is shown where there are three plies 22, 24, 26 of 6K carbon fiber yarn twisted together (at a twist multiplier of 2.1) to form the cord 18. Only yarn ply 22 schematically illustrates ends of yarns in the ply and yarn bundles 24, 26 are outlined in phantom for clarity to aid in illustrating a feature of the invention.

Urethane in castable liquid form has carboxyl groups that are polar. During the casting process of forming a belt, it is important that the liquid urethane wet the cord to an extent that it picks up urethane at interstices 28 formed between fiber filaments comprising the cord. A water based epoxy sizing as provided by Amoco has a UC309 finish that is polar. Such a polar material is preferred as it permits the epoxy to wet the cord during casting.

One way to characterize the ability of the carbon fiber to be wetted with the urethane is to measure the contact angle of carbon fiber with deionized water using a dynamic contact angle measuring instrument because deionized water is also polar. It has been determined that a carbon fiber contact angle with deionized water of less than 60 degrees, and more preferably less than 45 degrees, will provide a necessary penetration of the cord interstices for pick up of belt material as the belt is cast. The amount of belt material that a cord picks up during casting can be measured by weighing a length of greige cord and comparing it to a cord that is dislodged from a finished belt and measuring the weight difference. In this manner, cord pick up of belt material in mg per $mm^3$ of cord volume can be determined for each millimeter of cord length.

There is a minimum amount of penetration to a point 30 (schematically illustrated by a phantom line) where the cord picks up a sufficient amount of urethane where the belt of the invention exhibits improved performance over comparative prior art belts such as belts constructed with a tensile member of an aramid fiber. The penetration may be more complete and to a point 32 (illustrated by a phantom line) whereby the cord picks up more belt material and the belt exhibits a substantial increase in performance over aforementioned prior art belts.

Figure 3:
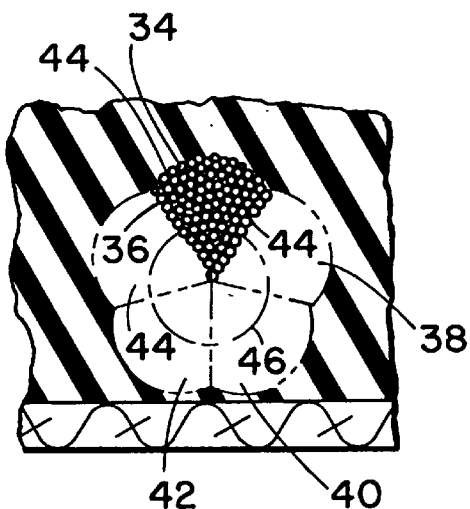
FIG. 3 is a view similar to FIG. 2 but showing a prior art embedded cord.

Referring to FIG. 3, a prior art belt tensile member cord of aramid is shown. The cord comprises five yarn bundles 36, 38, 40, 42, 44 where each yarn bundle is first twisted in one direction to form a ply and thereafter, the plies are twisted together in an opposite direction to form a cord 34. Only ply 36 schematically illustrates ends of individual yarns in a yarn ply. Yarn plies 36–42 are outlined in phantom for clarity.

Aramid fiber is fragile in compression but to a lesser extent than carbon fiber. Aramid fiber may be treated with a sizing by a yarn manufacture, and thereafter coated with an epoxy to inhibit the fiber from fracturing as yarns are twisted first in one direction and then oppositely in another direction to form a cord. The epoxy coating does not completely seal the cord 34 but rather leaves interstices 45 where liquid urethane may penetrate the cord during the belt manufacturing process. Care must be taken to preclude penetration of a cord beyond some point 46 because too much urethane pick up will result in a decrease in belt life. The decrease in belt life may be attributed to what is taught in the aforementioned prior art (e.g. Terhune) where complete penetration of the cord interstices with urethane tends to make a solid mass of the cord and the belt and thereby reduces elasticity. The belts become harder to bend (i.e. there is an increase of bending modulus or, stated conversely, a reduction in belt flexibility for bending around pulleys where the cord is filled with urethane.)

Belts built in accordance with the invention may have a cord construction of any desired type including the types illustrated in FIGS. 2 and 3. Such belts are initially stiff in bending as compared to similar belts built with aramid cord. As predicted by the prior art, belts are stiff in bending because urethane penetrates interstices of the cord to the extent that it approaches making a solid mass of the cord. Initially, the belts are so stiff that there is oftentimes a snapping/cracking heard when the belts are manually bent. The snapping/cracking is believed to be a result of individual fibers of the cord being fractured. Also, when the belts are operated around pulleys there is a noticeably rapid tensile strength decay in the belt (e.g. decreasing to 27 percent to 40 percent in 500 hours) giving the indication that the belts would be unsuitable for service. Prior art belts with aramid cord exhibit less tensile strength decay going to 50 percent to 53 percent in 500 hours. In summary, the snapping/cracking and tensile decay would lead one to believe (and as based on the prior art) that such belts would be unsatisfactory. Contrary thereto, the belts of the invention prove to be a substantial improvement over prior art belts of similar construction where the only major difference was the cord material and the cord treatment.

To characterize the features of the invention, 8 and 14 mm pitch belts were built and tested. Belts built in accordance with the invention included carbon fiber cord with a cord treatment involving the cord picking up various amounts of belt material. Belts of the invention were bench marked against belts similarly constructed except that the cord was comprised of aramid material with the aramid cord picking up various amounts of belt material. The so constructed belt had cord constructions in accordance with that as shown in Table 1.

TABLE 1

| | Belt Pitch | |
|---|---|---|
| Cord | 8 mm | 14 mm |
| Carbon Fiber | | |
| gauge, mm | 1.07 (.042 in.) | 1.98 (.078 in.) |
| denier | 10,800 | 32,400 |
| construction | 6K-3 | 6K-9 |
| | (18,000 fibers) | (54,000 fibers) |
| Aramid | | |
| gauge, mm | 1.16 (.046 in.) | 2.29 (.090 in.) |
| denier | 8,640 | 32,700 |
| construction | 4 × 2160 | 5 × 6540 |

Figure 4:
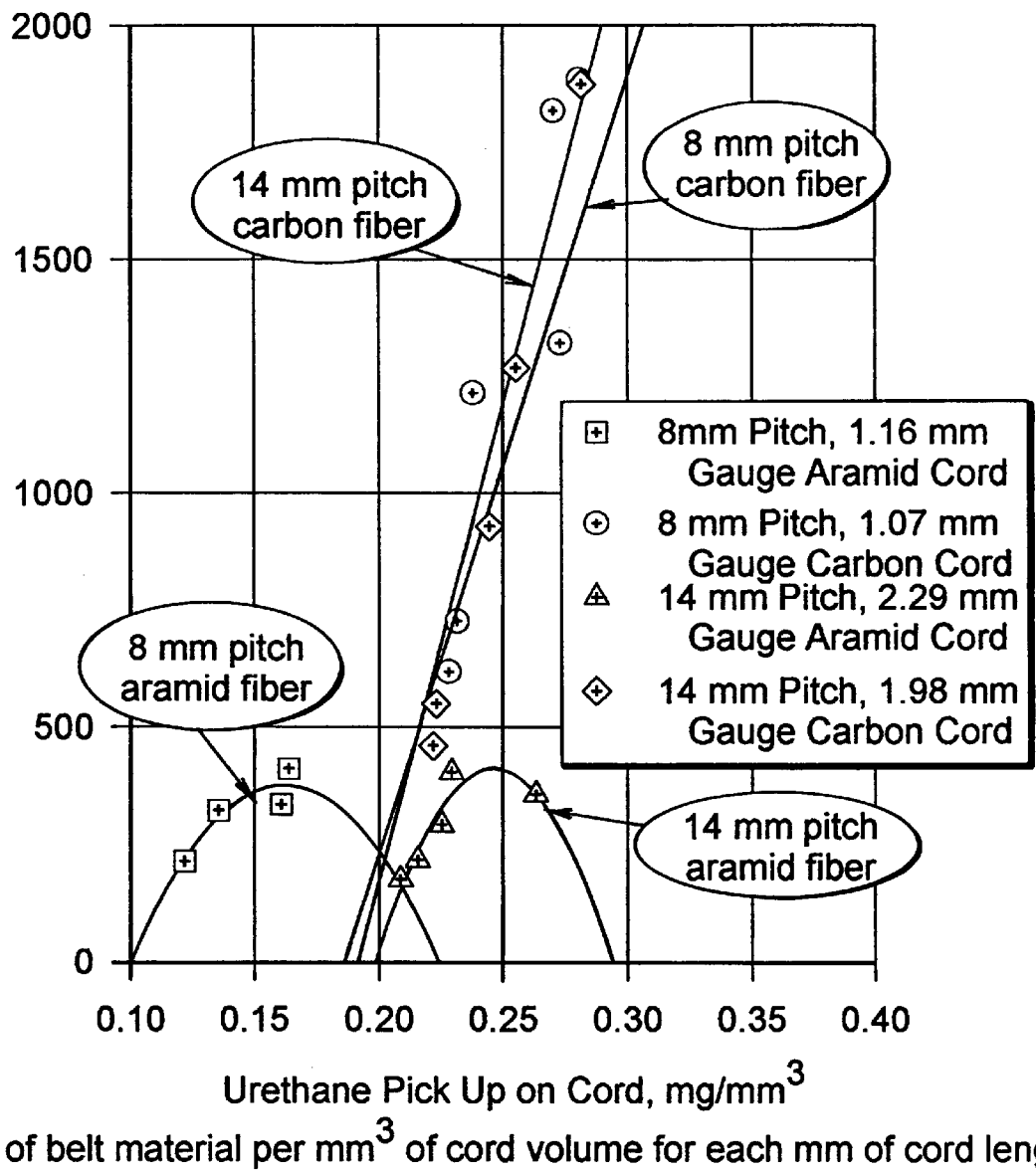
FIG. 4 is a chart showing belt performance as a function of cord treatment for the belts of the invention and prior art belts.

The so constructed belts were power tested and compared to each other. The power testing included operating 8 mm belts from 17.2 to 25.8 horse power over 24 groove pulleys at 200 rpm until belt failure and 14 mm pitch belts over 32 groove pulleys from 60 to 92.3 horse power at 1750 rpm until belt failure. Referring to FIG. 4, 8 mm belts with aramid cord and having a urethane pick up of 0.16 $mg/mm^3$ reach a maximum belt life of about 400 hours and decrease in performance to a belt life of about 160 hours when the urethane pick up was increased to 0.21 $mg/mm^3$. Similarly, 14 mm aramid cord belts performed well at about 400 hours belt life until the urethane pick up exceeded 0.26 $mg/mm^3$ when belt life starts dropping at about 380 hours.

In contrast to the aramid cord belts, both 8 and 14 mm pitch belts built with carbon fiber cord and in accordance with the invention exhibited an unexpected improvement in performance in terms of belt life of about 480 hours when the cord interstices of the belt picked up a minimum of about 0.20 mg of belt material per $mm^3$ of cord volume for each mm of cord length. There was even a more substantial improvement in belt performance with belt lives of about 800 hours when the carbon cord picked up a minimum of about 0.24 mg/mm$^3$. When urethane pick up increases to 0.28 mg/mm$^3$ belt performance increases to about 1900 hours. Satisfactory cord penetration with belt material during casting of the belts was achieved when the carbon fibers formed a contact angle with deionized water of about 60 degrees or less. Belts having a ⅜ pitch and a carbon fiber cord with 6K-2 (12,000 fibers) construction were also built.

The foregoing detailed description is made for purposes of illustration only and is not intended to limit the scope of the claims.

What is claimed is:

1. A synchronous power transmission belt comprising a belt body of cast urethane belt material; belt teeth formed of the body and spaced apart at a pitch; a wear-resistant fabric reinforcement disposed along peripheral surfaces of the belt teeth; a tensile member of helically spiraled cord having length and volume embedded in the belt body and of a yarn of fibers; and wherein the improvement comprises:

a tensile member of a cord of a yarn of carbon fibers with interstices between the fibers; and belt material penetrating at least a portion of the cord interstices as the belt is cast wherein the cord interstices contains a minimum of about 0.21 mg of belt material per mm$^3$ of cord volume for each mm of cord length.

2. The belt as claimed in claim 1 wherein the cord interstices contain a minimum of about 0.24 mg of belt material per mm$^3$ of cord volume for each mm of cord length.

3. The belt as claimed in claim 1 wherein the cord interstices contain a minimum of about 0.28 mg of belt material per mm$^3$ of cord volume for each mm of cord length.

4. The belt as claimed in claim 1 wherein the carbon fiber includes a sizing coating whereby the fibers form a contact angle with deionized water within the range of substantially 60 degrees to less than 60 degrees.

5. The belt as claimed in claim 4 wherein the contact angle is substantially 60 degrees.

6. The belt as claimed in claim 1 wherein the cord comprises from about 12,000 to about 54,000 carbon fibers.

7. The belt as claimed in claim 4 wherein the belt material and sizing are polar.

* * * * *

UNITED STATES PATENT AND TRADEMARK OFFICE
CERTIFICATE OF CORRECTION

PATENT NO. : 5,807,194
DATED : September 15, 1998
INVENTOR(S) : Paul S. Knutson and Walter L. Dodson It is certified that error appears in the above-identified patent and that said Letters Patent is hereby corrected as shown below:

In claim 1, line 19, the word "yam" should be corrected to read --yarn--.

In claim 1 (col. 8 line 2) and Claim 2 (col. 8 lines 5-6) and Claim 3 (col. 8 lines 9-10) delete the words: "for each mm of cord length".

In Fig. 3 delete "44" and insert --45--.

In Fig. 4 delete the words in the legend:

"for each mm of cord length".

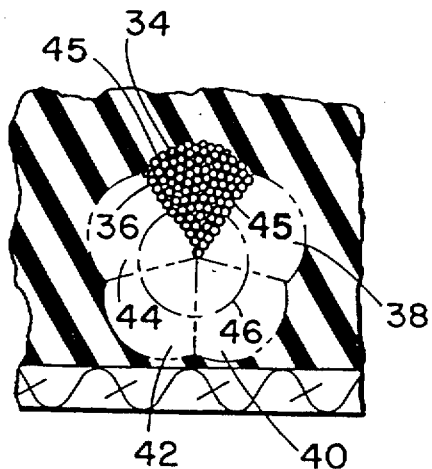

FIG. 3
Prior Art
Aramid

Signed and Sealed this

Twenty-eighth Day of December, 1999

*Attest:*

Q. TODD DICKINSON

*Attesting Officer*    *Acting Commissioner of Patents and Trademarks*